United States Patent [19]

Nishimura et al.

[11] 4,451,428
[45] May 29, 1984

[54] CONTROL RODS AND METHOD OF PRODUCING SAME

[75] Inventors: Eiichi Nishimura; Shunsuke Uchida, both of Hitachi; Masao Kitamura, Hitachiota; Koichi Saito, Hitachi; Eishi Ibe, Katsuta; Tatsuo Hayashi, Hitachi, all of Japan

[73] Assignee: Hitachi, Ltd., Tokyo, Japan

[21] Appl. No.: 222,060

[22] Filed: Jan. 2, 1981

[30] Foreign Application Priority Data

Jan. 7, 1980 [JP] Japan .................................. 55-112

[51] Int. Cl.³ .............................................. G21C 7/10
[52] U.S. Cl. .................................. 376/333; 156/620; 156/DIG. 95
[58] Field of Search .............. 376/333, 334, 339, 900, 376/327; 75/65.2 M, 177; 156/DIG. 95, 620

[56] References Cited

U.S. PATENT DOCUMENTS

| 2,739,088 | 3/1956 | Pfann | 75/65.2 M |
| 3,086,857 | 4/1963 | Pfann | 75/652 M |
| 3,103,479 | 9/1963 | Ransohoff | 376/447 |
| 3,230,147 | 1/1966 | Hitchcock | 376/333 |
| 3,234,104 | 2/1966 | Gale et al. | 376/327 |
| 3,255,086 | 6/1966 | Hitchcock | 376/333 |
| 3,773,617 | 11/1973 | Marmonier et al. | 376/327 |

FOREIGN PATENT DOCUMENTS

| 8292 | 1/1977 | Japan | 376/334 |
| 19893 | 2/1977 | Japan | 376/334 |
| 850999 | 10/1960 | United Kingdom | 376/339 |
| 917015 | 1/1963 | United Kingdom | 376/339 |

OTHER PUBLICATIONS

Volkov et al, "Use of Burnable Poisons in Nuclear Reactors", 1962, pp. 745-757 (translation from vol. 11, No. 2 of Atomnaya Energiya).
Nuclear Science and Eng. vol. 4, pp. 357-371, (1958), Anderson
Nucleonics, 5/58, pp. 88-92, Dunning et al.
Nuclear Power, Dec. 1960, pp. 86, 87.
Reactor Handbook (2nd Ed.) vol. 1, Materials, 1960, edited by Tipton, Jr., Interscience Publishers, Inc., N.Y., pp. 777-789.
ORNL-3160, 5/61, p. 48.

Primary Examiner—Harvey E. Behrend
Attorney, Agent, or Firm—Antonelli, Terry & Wands

[57] ABSTRACT

A control rod for a boiling-water reactor having blades arranged in the form of a cross in transverse cross section includes a plurality of poison tubes disposed therein. Boron carbide powder which is a neutron absorbing material causing an (n, α) reaction to take place is charged in the poison tubes. The control rod has plates of Hf-Zr alloy arranged in the blades in a position nearer to a forward end of the control rod at which the control rod is inserted in a reactor core than the poison tubes. The plates of Hf-Zr alloy are formed of an alloy of Hf having a large neutron absorption cross section and Zr having a small neutron absorption cross section. The concentration of Hf in the plates of Hf-Zr alloy is successively reduced in going from an end thereof adjacent the poison tubes toward and end thereof at the inserting end of the control rod. The plates of Hf-Zr alloy and the poison tubes have the same neutron absorbing capacity at the boundary therebetween at which they are in contact with each other.

16 Claims, 8 Drawing Figures

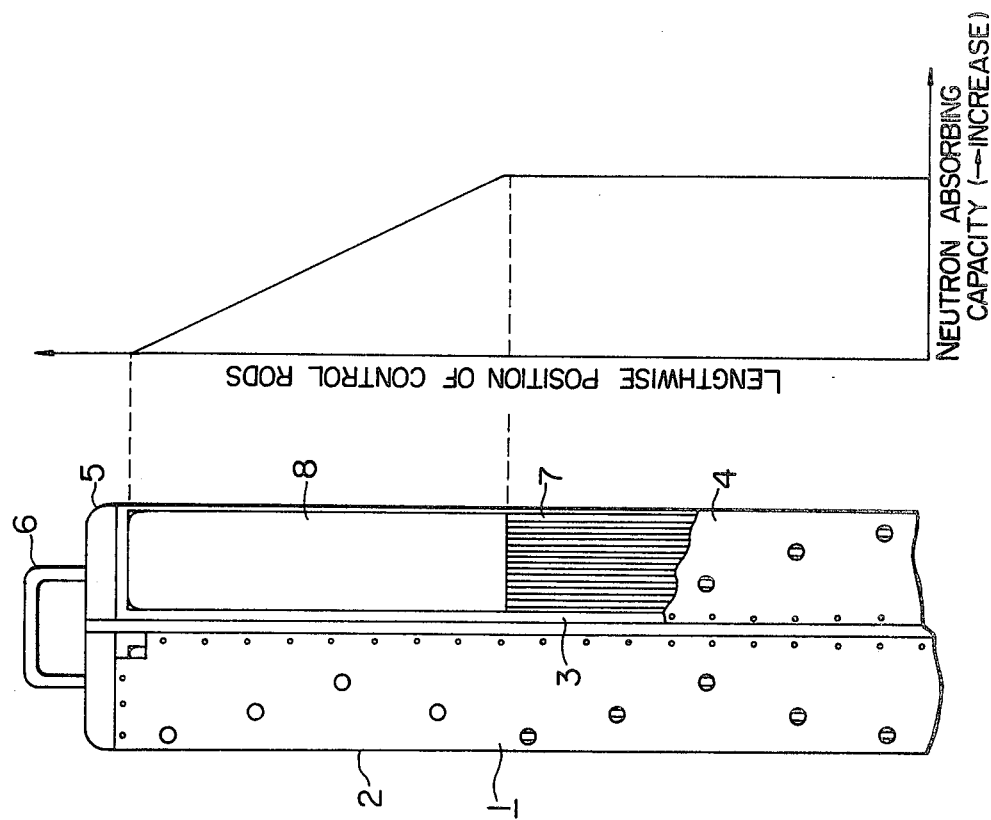
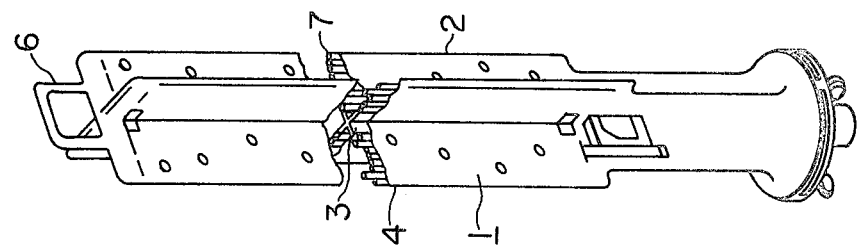

CONTROL RODS AND METHOD OF PRODUCING SAME

BACKGROUND OF THE INVENTION

This invention relates to control rods and method of producing same, and more particularly it is concerned with a control rod having a prolonged service life and a method for producing such control rod.

A control rod has the function of controlling the number of neutrons concerned in a chain reaction of nuclear fission involving 235U in the fuel rods disposed in the core of a nuclear reactor, by virtue of the presence of materials of large neutron absorption cross section in the control rod. Thus control rods are used for controlling the power of a nuclear reactor.

Control rods used in a boiling-water nuclear reactor will be described. A control rod includes blades in the form of a cross in transverse cross section having arranged therein a plurality of sealed poison tubes each containing powder of boron carbide (hereinafter $B_4C$) serving as a neutron absorber. The blade has a sheath enclosing the plurality of poison tubes.

SUMMARY OF THE INVENTION

This invention has as its object the provision of a control rod of prolonged service life which is capable of flattening a neutron flux distribution in the vicinity of the forward end portion of the control rod being inserted in the reactor core.

The outstanding characteristic of the invention is that in a control rod comprising first neutron absorber causing an $(n, \alpha)$ reaction to take place and a second neutron absorber causing an $(n, Y)$ reaction to take place, the second neutron absorber is disposed in an end portion of the control rod at which the control rod is inserted in the core and formed of an alloy containing a material of large neutron absorption cross section and a material of small neutron absorption cross section.

BRIEF DESCRIPTION OF THE DRAWINGS

FIG. 1 is a perspective view of the control rod comprising one embodiment of this invention, showing its external appearance;

FIG. 2A is a fragmentary sectional view of the control rod shown in FIG. 1;

FIG. 2B is a diagrammatic representation of changes occurring in the neutron absorbing capacity of the control rod shown in FIG. 2A lengthwise thereof;

DESCRIPTION OF THE PREFERRED EMBODIMENTS

Figure 3:
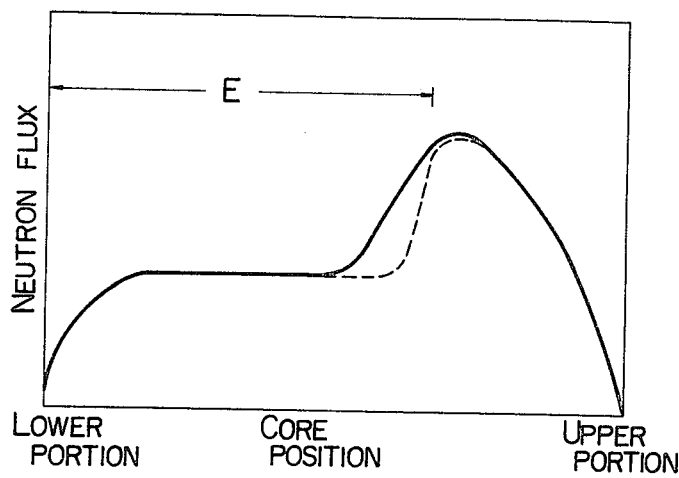
FIG. 3 is a diagrammatic representation of the neutron flux distribution in the core at the time of insertion of the control rod shown in FIG. 2A into the core.

This invention has been developed based on the results of detailed study of the performances of control rods of the prior art. The results of the detailed study will be described hereinafter.

Generally, the service life of a control rod is evaluated in terms of a nuclear lifetime of boron (i.e. the time until which boron loses its neutron absorbing capacity) and a mechanical life. The nuclear lifetime is determined by the neutron absorbing capcacity or the amount of boron-10 (hereinafter $B^{10}$) in the powder of $B_4C$ charged in the poison tubes. The mechanical life may vary depending on the material strength of the poison tubes and evaluation of the stress. In desiging a control rod, it is required that the control rod has a longer mechanical life than a nuclear lifetime.

Meanwhile the $B^{10}$ in the $B_4C$ having a neutron absorbing capacity under goes an $(n, \alpha)$ reaction and absorbs neutron, thereby producing helium. This causes swelling of the $B_4C$ powder, tending to cause the poison tubes to expand outwardly. The phenomenon of swelling of the $B_4C$ power is most markedly observed in a forward end portion of the control rod at which the rod is inserted into the core and which has the highest degree of burn-up. There are possibilities that the sheaths of the poison tubes are expanded outwardly and suffer damage. Thus the mechanical life of the poison tubes determined by evaluation of the stress at the forward end portion of the control rod at which the rod is inserted in the core determines the service life of the control rod because it is about one-half the nuclear life.

When a control rod is inserted in the core, the neutron flux distribution shows a sudden change in the vicinity of the forward end portion of the control rod at which the rod is inserted. Being proportional to the neutron flux distribution, the reactor power distribution also shows a sudden change in the vicinity of the forward end portion of the control rod at which the rod is inserted. This gives rise to the possibilities that the fuel rods disposed in the nuclear core might suffer damage.

Heretofore, various proposals have been made to obviate the aforesaid problems. As a means for prolonging the mechanical life, it has been proposed to fill the forward end portions of the poison tubes at which the control rod is inserted with Ag-Cd-In powder which mainly causes an $(n, Y)$ reaction to take place. This proposal has not been put to practical use because of complex production steps involved.

On the other hand, a proposal has been made to use a control rod in which the neutron absorbing capacity is gradually reduced in going toward the forward end portion at which the rod is inserted, to obtain flattening of the neutron flux distribution in the vicinity of the forward end portion of the control rod at which the rod is inserted. In this proposal, there are several problems that should be solved before the proposal is carried into practice. One of such problems is how to adjust the neutron absorbing capacity in the connection between the forward end portion (gray nose portion) at which the neutron absorbing capacity is reduced and the control rod main body having uniform neutron absorbing capacity. Another problem is how to successively change the neutron absorbing capacity in the gray nose portion extending from the connection to the forward end. However, a process is known whereby the neutron absorbing capacity of a control rod is successively changed in going toward the forward end of the control rod by forming the control rod from a material having uniform neutron absorbing capacity and reducing the thickness of the rod in going toward the forward end. Macroscopically speaking, this process causes the neutron absorbing capacity to be successively reduced. However, the neutron absorbing capacity undergoes a sudden change in the forward end portion of the control rod when this process is used, when considered from a microscopic standpoint.

One embodiment of the present invention which is based on the results of the study described hereinabove will now be described by referring to FIGS. 1, 2A and 2B.

A control rod 1 used for a boiling-water reactor has blades 2 in the form of a cross in transverse cross section. The blades 2 each have a sheath 4 (formed of SUS 304) attached to one of four sides of a tie rod 3 in the form of a cross disposed in the center of the control rod 1. A support member 5 is connected to an end of the control rod 1 at which the rod is inserted and attached to an upper end of the tie rod 3. A handle 6 is connected to the support member 5. Another support member, not shown, of the same shape as the support member 5 is connected to the lower end of the tie rod 3. A plurality of poison tubes 7 having a charge of $B_4C$ powder filled therein are arranged in each sheath 4 and supported by the lower support member. A neutron absorbing plate 8 is arranged in each sheath 4 in a portion of the control rod 1 disposed nearer to its forward end of entry into the core than the poison tubes 7, and maintained at its lower end in contact with the upper ends of the poison tubes 7. The neutron absorbing plates 8 are neutron absorbers formed of an alloy of a material of large neutron absorption cross section and a material of small neutron absorption cross section.

Table 1 shows the thermal neutron absorption cross sections of principal materials.

TABLE 1

| Type | Material | Thermal Neutron Absorption Cross Section (Barn) |
|---|---|---|
| 1 | Zirconium | 0.18 |
|   | Aluminum | 0.22 |
|   | Zinc | 1.1 |
|   | Niobium | 1.1 |
|   | Iron | 2.4 |
|   | Chromium | 2.9 |
|   | Steel | 3.6 |
|   | Nickel | 4.5 |
| 2 | Hafnium | 115 |
|   | Boron | 750 |
|   | Cadmium | 2400 |
|   | Samarium | 6500 |
|   | Gadolinium | 44000 |

In this specification, materials having a thermal neutron absorption cross section of over 100 barns are defined as materials of large neutron absorption cross section and materials having a thermal neutron absorption cross section of below 100 barns are defined as materials of small neutron absorption cross section, from the point of view of controlling the chain reaction of neutrons. In the materials shown in Table 1, type 1 materials are of small neutron absorption cross section and type 2 materials are of large neutron absorption cross section. The neutron absorbing plates 8 are formed of an alloy of the materials of type 1 and type 2 shown in Table 1.

The control rod 1 is connected at its lower end portion to a control rod driving apparatus mounted in a pressure vessel of a nuclear reactor and inserted between fuel assemblies arranged in an array in the core in the pressure vessel. When inserted in the core, the control rod 1 is inserted at its upper end or the end at which the handle 6 is connected. That is, the handle 6 is at the end of the control rod 1 at which the rod 1 is inserted.

The embodiment will be described as using a Hf-Zr alloy for forming the neutron absorbing plates 8. In a Hf-Zr alloy, hafnium is the material of large neutron absorption cross section and zirconium is the material of small neutron absorption cross section.

The reasons why the Hf-Zr alloy is arranged in the forward end portion only of the control rod 1 are that the portion of a control rod that has determined the control rod life in the prior art is the forward end portion that has a high degree of burn-up, and that it is necessary to reduce the weight of the absorbers because hafnium is expensive. When neutron absorbers formed of hafnium are located in every part of the control rod 1, the control rod would have a weight about three times as large as the weight of control rods of the prior art. This would make it necessary to improve the conventional control rod driving apparatus, as well as to increase the cost of the control rods.

One of the reaons why an alloy, such as a Hf-Zr alloy, is used for forming the neutron absorbing plates 8 is that the strength of the material of high neutron absorption cross section can be increased by using the material of low neutron absorption cross section as reinforcing material because the former has low strength as material.

The concentration of hafnium in each of the neutron absorbing plates 8 of Hf-Zr alloy is 100% in an end thereof at which it is in contact with the poison tubes 7 and gradually reduced in going toward the forward end of the control rod 1 until the concentration becomes zero at the forward end of the control rod 1. The neutron absorbing plates 8 of Hf-Zr alloy each have a length which is over 1/24 the total length of the control rod 1 (from the upper support member 5 to the lower support member) from the forward end of the control rod 1. This is because there is the possibility that a portion of the control rod 1 occupying about 1/24 its total length from its forward end is most liable to suffer damage. In case the length of the neutron absorbing plates 8 of Hf-Zr alloy is over ¼ the total length of the control rod 1, the control rod 1 would not have sufficient neutron absorbing capacity. Thus the length of the neutron absorbing plates 8 of Hf-Zr alloy is advantageously 1/24 to ¼ the total length of the control rod 1.

It is essential that the two neutron absorbing materials have substantially the same neutron absorbing capacity in the boundary between the poison tubes 7 and each neutron absorbing plate 8 of Hf-Zr alloy, in order to minimize thermal strain produced in the cladding of each fuel rod. Control material of 100% Hf matches control material of $B_4C$. This has been ascertained by the following method. It is known that the control material of Hf has substantially the same neutron absorbing capacity as control material of 3 wt% $B^{10}$ stainless steel (See Nuclear Reactor Material Handbook, published by Nikkan Kogyo Shimbunsha, page 415). Instead of comparing the neutron absorbing capacity of the control material of Hf with that of the control material of $B_4C$, the neutron absorbing capacity of the control material of Hf was compared with that of the control material of 3 wt% $B^{10}$ stainless steel. A comparison of the two control materials with each other with regard to the amount of $B^{10}$ that determines the neutron absorbing capacity of the two control materials carried out under the condition of charging rate of 70% of $B_4C$ powder and the abundance ratio of 18.8% of $B^{10}$ in $B_4C$ has shown that the amount of $B^{10}$ is $1.43\times10^{22}$ in the control material of $B_4C$ and $1.40\times10^{22}$ in the control material of 3 wt% $B^{10}$ stainless steel per 1 cc. It will be seen that the two control materials have substantially the same amount of $B^{10}$ and hence the same neutron absorbing capacity. From this observation, it can be surmised that the control material of Hf has substantially the same neutron absorbing capacity as the control material of $B_4C$. Thus by using the neutron absorbing plates 8 of Hf-Zr alloy as aforesaid, a neutron absorbing capacity distribution of the forward end portion of the control rod 1 as shown in FIG. 2B has been obtained. FIG. 3 shows a neutron flux distribution obtained when the control rod 1 having the neutron absorbing capacity distribution shown in FIG. 2B was inserted in an array of fuel rods in the reactor core. The symbol E designates the range of insertion of the control rod 1. In FIG. 3, a curve of dotted line represents a neutron absorbing capacity distribution of a control rod of the prior art used as a control. In FIG. 3, it will be seen that flattening of the neutron flux distribution can be obtained in the vicinity of the forward end portion of the control rod 1. This minimizes the risk that the control rod 1 might suffer damage due to the movement thereof in the reactor core when the control rod 1 is withdrawn from the core.

Figure 4:
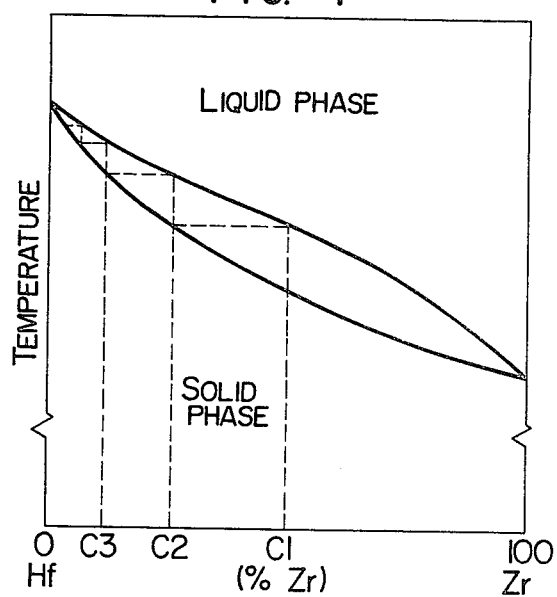
FIG. 4 is a phase diagram of Hf-Zr.
Figure 5:
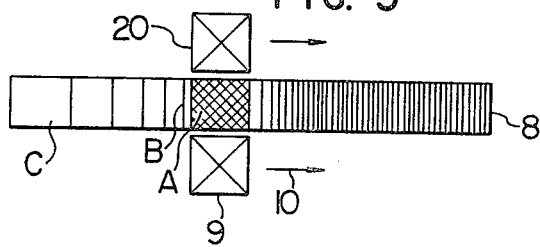
FIG. 5 is a view in explanation of the provision of an Hf concentration gradient to an alloy of the Hf-Zr system by a zone melting process.

FIGS. 4 and 5 are views in explanation of the principle of producing the neutron absorbing plates 8 of Hf-Zr alloy that have the neutron absorbing capacity distribution shown in FIG. 2B, by a zone melting process.

FIG. 4 is a phase diagram of a Hf-Zr alloy. As shown in the figure, the Hf-Zr alloy is an all solid solution type alloy in which Hf has a higher melting point than Zr.

FIG. 5 shows a zone melting process in which 9 designates a movable heater adapted to move in the direction of an arrow 10. The numeral 8 designates a plate of Hf-Zr alloy. Assume that the movable heater 9 is disposed in the position shown in FIG. 5 after being moved from the left end of the Hf-Zr alloy plate 8. A hatched zone A is already melted by the heat of the movable heater 9. As the movable heater 9 moves slowly in the direction of the arrow 10, the molten metal of the zone A solidifies in a zone B. Assume that the composition of the liquid metal in zone A has a concentration of C1 shown in FIG. 4. It will be seen that the composition of the alloy that solidifies in zone B has a concentration of C2 as shown in FIG. 4. Stated differently, the Zr originally located in zone B is forced to move to zone A which is a molten section disposed rightwardly of zone B. In this way, the concentration of Hf in the plate 8 of Hf-Zr alloy becomes higher in going from the right end toward the left end of the plate 8 in FIG. 5. By repeating the aforesaid process, the zone originally having the concentration of C1 can be made to have increasingly higher concentrations C2, C3, ..., and the left end portion of the plate 8 shown in FIG. 5 can be made progressively to have a 100% concentration of Hf. A suitable Hf concentration distribution can be obtained in the plate 8 of the Hf-Zr alloy by controlling the speed of movement of the movable heater 9, varying the number of movements of the movable heater 9 in different portions of the plate 8, and varying the temperature at which heating is effected by the movable heater 9 in different portions of the plate 8. Thus when a zone melting process is used, a concentration gradient of one element of an alloy can be readily imparted to the alloy when it is of the Hf-Zr alloy (all solid solution type alloy).

The sheaths 4 are each attached to one of four sides of the tie rod 3 and the lower support member of the cross shape is connected to the lower end of the sheaths 4. A plurality of poison tubes 7 are inserted in each of the sheaths 4, and then the neutron absorbing plates 8 of the Hf-Zr alloy having a Hf concentration gradient imparted thereto by the zone melting process are each inserted in one of the sheaths 4, so that the plates 8 are located in the upper portion of the control rod 1 above the poison tubes 7. Thereafter the support member 5 having the handle 6 is connected to the upper ends of the sheaths 4.

The embodiment of the invention shown and described hereinabove can achieve the effects described hereinafter. Hf causes an (n, Y) reaction to take place and produces no gas when it absorbs neutrons. The arrangement whereby the neutron absorbing plates 8 of Hf-Zr alloy are located in the forward end portion of the control rod 1 having a high neutron absorption rate at which the control rod 1 is inserted in the core minimizes swelling of the $B_4C$ powder in the poison tubes 7, thereby markedly reducing the risk of the control rod 1 suffering damage and improving the safety thereof. In the forward end portion of the control rod 1, the concentration of Hf is reduced successively in going toward the forward end of the rod 1, thereby enabling changes in the reactor power occurring axially of the core or those occurring in the vicinity of the forward end portion of the control rod 1 in particularly to take place smoothly as the control rod 1 is inserted in the nuclear core. This minimizes changes in reactor power occurring when the control rod 1 is withdrawn, thereby minimizing damage suffered by the control rod 1. The progressive reduction of the Hf concentration in the Hf-Zr alloy can be readily achieved, so that the neutron absorbing plates 8 can have a suitable Hf concentration gradient.

Figure 6:
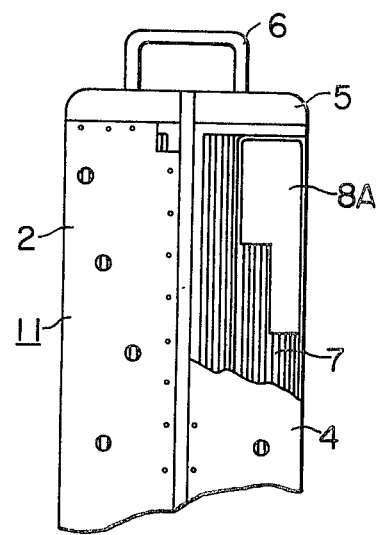
FIGS. 6 and 7 are sectional views of the essential portions of the control rods comprising other embodiments of the invention.
Figure 7:
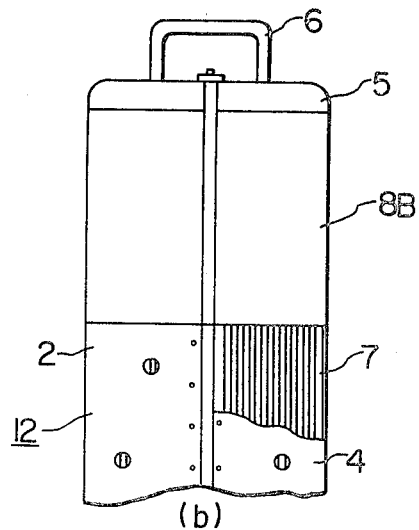

FIGS. 6 and 7 show other embodiments of the invention. In the embodiments shown in FIGS. 6 and 7, parts similar to those of the embodiments shown in FIGS. 1, 2A and 2B are designated by like reference characters. In the embodiment shown in FIG. 6, the control rod 11 has the neutron absorbing plates 8A of Hf-Zr alloy each arranged at an outer peripheral edge of one of the blades 2 which shows the highest degree of burn-up. In control rods of the prior art, swelling has tended to occur in the portion of each blade 2 at which the neutron absorbing plate 8A of Hf-Zr alloy is arranged. In the embodiment shown in FIG. 7, the control rod 12 has the neutron absorbing plates 8B formed of an alloy of high physical and chemical stability and high strength serving as blades directly exposed to cooling water without being converted with sheaths.

The present invention enables the risk of the control rod suffering damage to be minimized and permits changes in reactor power to take place smoothly when the control rod is inserted in or withdrawn from the reactor core. The forward end portion of the control rod at which the control rod is inserted in the reactor core can be readily imparted with a suitable neutron absorbing material concentration gradient.

What is claimed is:

1. A method of producing a control rod comprising the steps of:
   producing by a zone melting process a second neutron absorbing material causing an (n, Y) reaction to take place by continuously reducing the ratio of a material of large neutron absorption cross section to a material of small neutron absorption cross section in going from at least a predetermined position along a major portion of said second neutron absorbing material toward one end thereof; and arranging said second neutron absorbing material in an end portion of the control rod at which the control rod is inserted in a reactor core, said second neutron absorbing material being located nearer to said inserting end of the control rod than a plurality of poison tubes having a charge of a first neutron absorbing material causing an (n, α) reaction to take place filled therein and sealed, said second neutron absorbing material extending in the insertion direction of the control rod and having a volume which exhibits substantially no decrease along the extent of said second neutron absorbing material in the insertion direction and said first and second neutron absorbing materials have substantially the same neutron absorbing capacity in an area between the poison tubes and the second neutron absorbing material.

2. A method according to claim 1, wherein said second neutron absorbing material is in the form of neutron absorbing plates extending in the insertion direction of the control rod.

3. A method according to claim 2, wherein the step of arranging includes arranging said neutron absorbing plates to contact an end portion of at least a portion of said plurality of poison tubes with said neutron absorbing plates extending forwardly therefrom, said neutron absorbing plates and said poison tubes having substantially the same absorption cross section in the region of contact therebetween.

4. A method according to claim 1, wherein said second neutron absorbing material is an all solid solution type alloy.

5. A control rod for a nuclear reactor comprising an absorber rod means extending in the direction of insertion of the control rod in a reactor core, said absorber rod means being charged with a material having a large neutron absorption cross section for causing an (n, α) reaction to take place upon absorbing neutrons, and neutron absorbing plates extending in the insertion direction of the control rod and being arranged at a forward end portion of the control rod, said neutron absorbing plates being formed of an alloy of a material of a large neutron absorption cross section and a material of a small neutron absorption cross section for causing an (n, Y) reaction to take place upon absorbing neutrons, the mixing ratio of said material of small neutron absorption cross section to said material of large neutron absorption cross section in said alloy being continuously varied in the insertion direction from at least a predetermined position along the extent of a major portion of said neutron absorbing plates and becoming increasingly higher toward the forward end of the control rod, said neutron absorbing plates having a volume which exhibits substantially no decrease along the extent of said neutron absorbing plates in the insertion direction and said material charged in said absorber rod means and said material of said neutron absorbing plate have substantially the same neutron absorbing capacity in an area between the absorber rod means and the neutron absorbing plate.

6. A control rod according to claim 5, wherein said neutron absorbing plates contact an end portion of at least a portion of said absorber rod means and extend forwardly therefrom, said neutron absorbing plates and said absorber rod means having substantially the same absorption cross section in the region of contact therebetween.

7. A control rod according to claim 5 or 6, wherein the material with which said absorber rod means is charged is boron carbide and the alloy forming said neutron absorbing plates is an Hf-Zr alloy.

8. A control rod according to claim 7, wherein said absorber rod means comprises a plurality of poison tubes.

9. A control rod according to claim 5, wherein the variation in the mixing ratio of the materials of said alloy forming said neutron absorbing plates is obtained by a zone melting process.

10. A control rod according to claim 9, wherein said alloy forming said neutron absorbing plates is an all solid solution type alloy of an Hf-Zr alloy.

11. A method according to claim 1, wherein the ratio is continuously reduced in a linear manner.

12. A method according to claim 1, wherein the volume of said second neutron absorbing material is substantially constant along the extent thereof.

13. A method according to claim 1, wherein the volume of said second neutron absorbing material increases along the extent thereof in the insertion direction.

14. An apparatus according to claim 5, wherein the mixing ratio continuously varies in a linear manner.

15. A control rod according to claim 5, wherein the volume of said neutron absorbing plates is substantially constant along the extent thereof.

16. A control rod according to claim 5, wherein the volume of said neutron absorbing plates increases along the extent thereof in the insertion direction.

* * * * *